May 23, 1950 — M. L. ARNOLD — 2,508,881
APPARATUS FOR PROCESS CONTROL
Filed Feb. 12, 1946 — 2 Sheets-Sheet 1
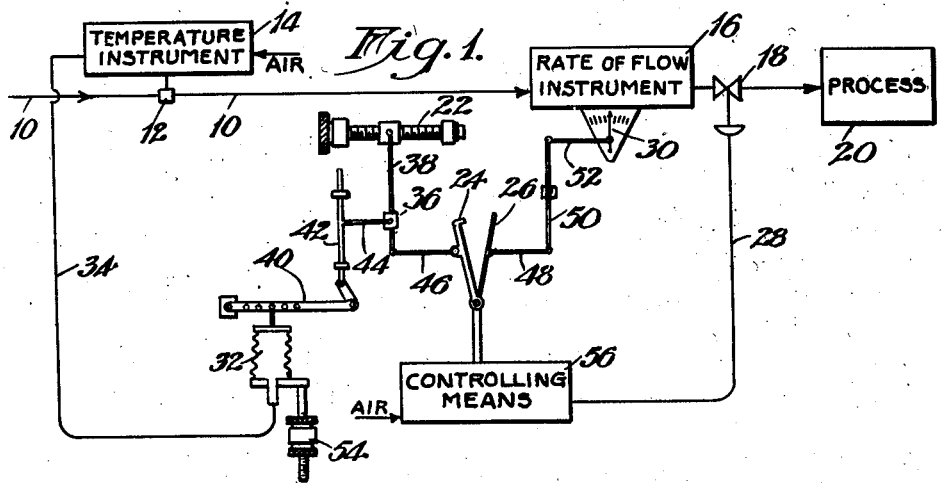
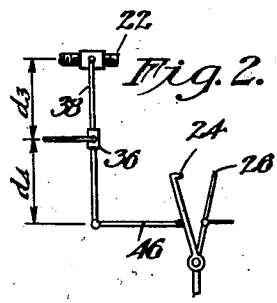
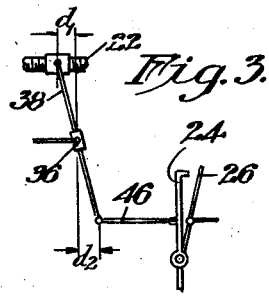
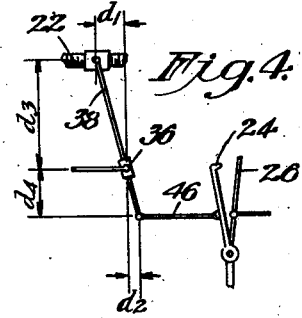
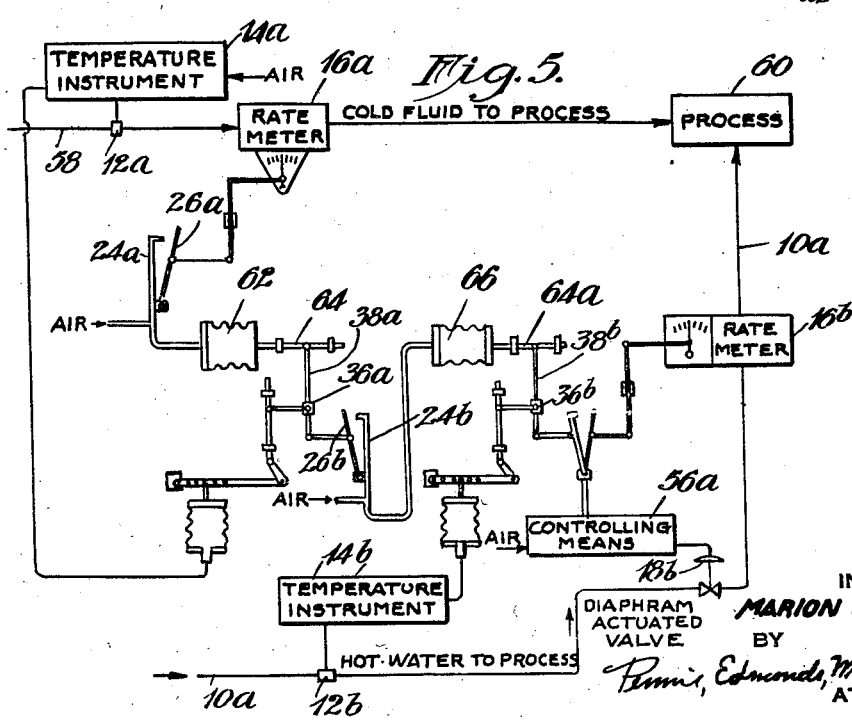
INVENTOR
MARION L. ARNOLD
BY
Pennie, Edmonds, Morton & Barrows
ATTORNEYS

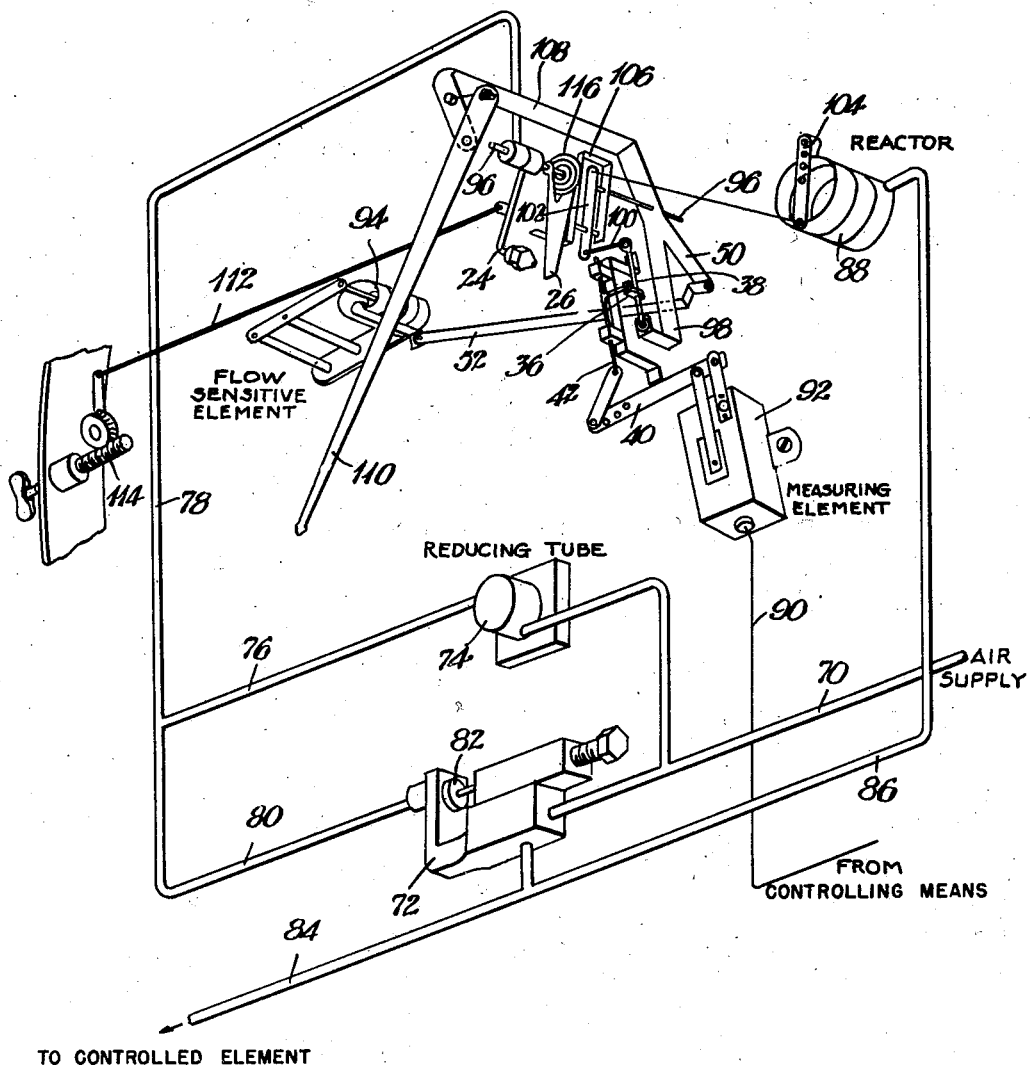

Patented May 23, 1950

2,508,881

UNITED STATES PATENT OFFICE 2,508,881

APPARATUS FOR PROCESS CONTROL

Marion Leon Arnold, Long Beach, Calif., assignor to Richfield Oil Corporation, Los Angeles, Calif., a corporation of Delaware Application February 12, 1946, Serial No. 647,161

2 Claims. (Cl. 74—1)

My invention relates to improvements in apparatus for controlling industrial processes, and more particularly to apparatus in which certain process variables are permitted to change while other variables are changed proportionally.

In the usual process control systems, the process operation is maintained constant by controls adapted to maintain all process variables constant. For example, if it is desired to deliver a constant quantity of heat to a process by means of a heating medium such as hot water, both the rate of flow and the temperature of the hot water are maintained constant. Similar practice is employed in distillation processes in which a portion of the overhead product is condensed and returned as reflux to the upper section of a distilling or fractionating column, since, according to accepted practice, the reflux is returned at a constant rate, or at a rate which is proportional to the feed rate or to the rate at which the overhead product is produced. Inasmuch as the object is to control the ratio of liquid downflow and vapor upflow within the column, the control of reflux alone is not sufficient if the temperature of the returned reflux varies. This is apparent from the fact that the liquid downflow within the column is proportional to the difference between the heat content of the reflux as a vapor, at column pressure and temperature, and its heat content as a liquid at the temperature at which it enters the column. Therefore, if the temperature at which the liquid reflux enters the column varies, the difference in heat content also varies. In many processes it is not possible, or at least not practical to control certain variables so as to maintain them constant.

I have discovered that the problem of process control in such cases may be solved by allowing certain process variables to change and effect the control of the process by changing other variables proportionately. I have also devised an apparatus for effecting such controls. According to my method, if it is desired to deliver a constant quantity of heat to a process such as referred to above, the temperature of the heating medium or fluid may be allowed to vary within certain limits according to individual circumstances, thus causing an alteration of the heat content per unit of hot fluid. The control in such case, according to my invention is effected by proportionately varying the rate of flow of the hot fluid to the process, thereby maintaining the heat input constant. If the process is operated so that the rate of heat input thereto is a function of the unit rate at which a cold fluid is delivered to the process, the control may be effected by two methods; (1) by holding the temperature and rate of flow of the cold fluid constant and the temperature and rate of flow of the hot fluid constant, or (2) by allowing the temperature and the rate of flow of the cold fluid to vary, likewise the temperature of the hot fluid, and vary the rate of flow of the hot fluid proportionately.

The control of reflux liquid to a distilling or fractionating column may be controlled in accordance with the features of my invention by installing in the path of the reflux flow a temperature-sensitive device and using it to operate a control which compensates for variations in the temperature from a set temperature. For example, if the temperature of the liquid reflux decreased so as to effect a 10% increase in the difference between the enthalpies of the vapor and the liquid, the control device would act to decrease the flow of liquid reflux by approximately 9%. The variation in such a case could be accomplished (1) by changing directly the position of a motor valve in the reflux flow line; (2) by resetting the control point of a rate-of-flow controller controlling the reflux flow. This controller may, in addition, be primarily set by a temperature-sensitive device reacting to the temperature of some point in the column or overhead vapor line; (3) by changing directly the position of a valve by-passing or diverting liquid reflux away from the column.

Additional features and advantages of my invention will be better understood from the following more detailed description thereof taken in connection with the accompanying drawings illustrating the improved method and showing an apparatus for carrying out the method.

In the drawings:

Fig. 1 is a diagrammatic view of the flow sheet type in which a pneumatically operated instrument is employed in a process control operation for the purpose of illustrating the improved method.

Figs. 2, 3 and 4 are broken views of a portion of the control apparatus shown in Fig. 1, the views showing various positions in connection with an explanation of the control method.

Fig. 5 is a view similar to that of Fig. 1 illustrating a slightly different control operation in accordance with the present invention.

Fig. 6 is a diagrammatic view of a control instrument of the pneumatic type such as might be used in connection with the method illustrated in Fig. 1.

In the drawings, the pneumatic type controls are shown in a highly diagrammatic form with certain well-known devices omitted, such as the systems of hydraulic and pneumatic bellows and by-passes required to provide proportional movements in transmitters and controllers, devices for adjusting throttling range, devices for changing from manual to automatic set, floating type devices for automatic reset, and combinations of capacitors and resistors required for special effects. The use of these devices in automatic controllers are well understood, also the fact that they vary from one process to another.

In Fig. 1 of the drawings, the hot fluid such as hot water, for use in a particular process is conducted from a source, not shown, through a line 10, in contact with a temperature sensitive device 12 which forms a part of the temperature instrument 14. The hot water then flows through a rate-of-flow meter 16 and a motor-actuated valve 18, into the process operation 20 in which the hot water is utilized. The instrumentation shown in Fig. 1 is pneumatically operated as indicated, since provision is made for supplying air to various parts, as for example, the temperature instrument 14.

The instrument includes a hand-operated regulator 22 for positioning an air nozzle 24 with respect to a flapper 26, air being continuously bled from the nozzle 24 unless the flapper 26 is in actual contact with it. In a system of this type, the pressure of the air and therefore the positioning of the valve 18, to which air is supplied through a line 28, are proportional to the distance between the nozzle 24 and the flapper 26. So long as the pressure remains constant, the flow through the meter 16 does not change. If the flow does however tend to change, the display means 30 of the meter 16 moves, and this in turn changes the position of the flapper 26, causing the controlling means to restore the flow to the original value. If the position of the nozzle 24 is changed, a change in flow is produced, which is permanent, unless another change in nozzle position is made.

In Fig. 1, the bellows 32 is actuated by the temperature instrument 14 through an air line 34, and the position of the bellows at any instant is proportional to the temperature of the hot fluid, such as hot water flowing in the line 10. In view of the leverage arrangement shown, the position of a fulcrum 36, slidable on a lever 38, is also proportional to the temperature of the water in the line 10, and the flow may therefore be changed so that it is proportional to the change in the temperature of the hot water, that is, by changing the position of the fulcrum 36. The leverage means connecting the bellows 32 with the remainder of the control apparatus includes a horizontal lever 40 pivoted at one end to a fixed point and at the other end to a vertically operated shaft 42 slidable in spaced retaining brackets. A horizontal arm 44 on the shaft 42, is pivoted to the fulcrum slide 36 which is movable along the lever 38 pivoted to the adjusting means 22. The lower end of the lever 38 is pivoted to a horizontal arm 46 attached to the pivoted arm of the nozzle 24. The flapper 26 is also pivoted and connected by an arm 48 to a lever 50 and an arm 52, the lever 50 being pivoted at its center and the arm 52 being connected to the display means 30 of the rate-of-flow instrument 16. The bellows 32 is provided with a hand-operated means 54 for adjusting the position of the bellows. The air nozzle 24 is connected to a controlling means 56 to which air is supplied as indicated and which in turn supplies air to the nozzle 24 and to the motor valve 18.

The manner of changing the flow proportional to the hot water, by the apparatus shown in Fig. 1, may be explained and illustrated by reference to Figs. 2, 3 and 4, which show the effect of changing the position of the fulcrum 36. For purposes of illustration, let it be assumed that hot water is used in the process of Fig. 1, that its maximum temperature to the process is 180° F., and that its minimum temperature is 140° F.

In Fig. 2, the positions of the lever 38, of the nozzle 24 and of flapper 26, correspond to zero flow, while the fulcrum 36 is at a position corresponding to a temperature of 140° F. It will be noted that with the lever 38 in a vertical line, as shown in this figure, movement of the fulcrum 36 produces no change in the position of nozzle 24. In Fig. 2, it is also assumed that the fulcrum 36 is midway between the end pivot points of the lever 38 and that the distances $d_3$ and $d_4$ are equal. From the foregoing it will be understood that when the upper end of the lever 38 is set by the regulator 22 so that the lever 38 is in the vertical line as stated, that is, parallel to the vertical shaft 42, there will be zero flow in the line 10, and flow will not occur therein until the regulator 22 is set for flow, as described for example with reference to Fig. 3.

In Fig. 3 the upper end of the lever 38 has been moved a distance $d_1$ to the left while the fulcrum 36 remains unchanged. Therefore, since $d_3$ and $d_4$ are still equal, the movement $d_2$ will be equal to $d_1$. In this operation nozzle 24 has been brought closer to the flapper 26, the motor valve 18 partially opened, and the flow set up in the line 10 in Fig. 1. From a comparison of the relationships shown in Figs. 2 and 3, particularly from similar triangles, it can be shown that:

$$d_2 = \frac{d_4}{d_3} \times d_1$$

so that $d_2$ is that percentage of $d_1$ represented by 100 times the ratio of $d_4$ to $d_3$. Since the flow of water through the system shown in Fig. 1 is directly proportional to the movement of the distance $d_2$, it will also bear the same relationship to the movement or distance $d_1$, if the ratio of $d_4$ to $d_3$ is equal to unity. Therefore, if the upper end of lever 38 is moved by the setting device 22 the distance $d_1$, the flow will be increased a corresponding amount.

Now, with the upper end of the lever 38 in the position shown in Fig. 3, assume that the temperature of the water increases to 180° F. and also assume that the hot water leaves the process at a temperature of 100° F., and that the heat content of water changes by one B. t. u. per lb. per degree F. change in temperature. With an inlet temperature of 140° F., the water was providing 40 B. t. u.'s per lb. to the process. With the temperature increased to 180° F. the water yields 80 B. t. u.'s per lb. Therefore, a decrease of 50% in the flow rate should be effected in order to keep the heat input to the process constant. When the temperature changes from 140° F. to 180° F. the fulcrum 36 should be moved downward a distance such that the ratio of $d_4$ to $d_3$ changes from a value of 1 to a value of 0.5. This is the position shown in Fig. 4 of the drawings.

The instrument as shown in Fig. 2 is calibrated to provide this movement of the fulcrum 36 by means of the throttling range of the temperature instrument 14 and the adjustment provided between bellows 32 and fulcrum 36. If the expansion of the bellows 32 is linearly proportional to the temperature, the correct ratio of $d_4$ to $d_3$ will be given for all values of the temperature of the water in the line 10. If the expansion is not proportional to the first power of the temperature, it may be necessary to interpose a cam or a curved segment between the bellows 32 and the linkage connected to the fulcrum 36, to transform the bellows' motion into one which bears such a relationship to the temperature of the fluid. In certain instances motion proportional to some other power of the variable may be required.

The method of the present invention is applicable to many types of processes. For example, the method outlined in connection with the showing of Fig. 1 of the drawings might be applied to the operation of a furnace fired with a gaseous fuel of variable heat content. Furthermore, the furnace might be employed in the heating of a stream of oil to a constant temperature, in which case the rate meter 16 might be replaced with a temperature instrument sensitive to the temperature of the outlet of the heated oil stream. The temperature instrument 14 also might be replaced with a device indicative of the heat content of the fuel, such as a continuous calorimeter or a thermal conductivity cell or a specific gravity instrument calibrated in terms of the heat content of the fuel. Such device would be used to control the bellows 32.

Fig. 5 illustrates the application of the method of the present invention to a process to which a cold fluid and a hot fluid are supplied, and in which the temperature and rate of flow of the cold fluid are allowed to vary. Likewise, the temperature of the hot fluid, and its rate of flow are varied proportionately. In Fig. 5 the elements of the apparatus which are the same as in Fig. 1, are referred to by the same reference characters. The cold fluid is introduced into the system through a line 58 and passed in contact with the temperature sensitive instrument 12a, then through a rate-of-flow meter 16a, and finally into a process 60. The hot liquid is introduced into the process through a line 10a, passed in contact with a temperature sensitive instrument 12b, through a motor valve 18b, and through a rate-of-flow meter 16b, into the process 60.

The rate of flow and temperature of the cold fluid entering the process through the line 58 are measured, the display means of the rate meter 16a being arranged to actuate a flapper 26a. As this flapper moves with respect to a stationary nozzle 24a, the air pressure in a connected bellows 62 varies proportionately with the flow of cold fluid in the line 58. The bellows 62 actuates a shaft 64 to which one end of a lever 38a is pivoted. The upper end of the lever 38a, therefore, is positioned automatically by the bellows 62, and therefore moves flapper 26b in proportion to the flow of the cold fluid in the line 58. The fulcrum 36a in Fig. 5, together with its connected actuating mechanism is the same as that shown in Fig. 1, and is responsive to the temperature instrument 14a, thereby correcting the motion of flapper 26b for the heat content of the cold fluid.

In Fig. 5 the flapper 26b is mounted adjacent a stationary nozzle 24b and the movement of the flapper 26b varies the air pressure in a connected bellows 66 in which the pressure is proportional to the total quantity of heat which must be supplied to the process by the hot water. The movement of the bellows 66 actuates a shaft 64a to which is pivoted the upper end of a lever 38b, which also pivots on a fulcrum 36b. It will be noted that the lever 38b and its connected mechanism associated with the temperature instrument 14b, motor valve 18b, controlling means 56a, and rate meter 16b is the same as that described in connection with the apparatus shown in Fig. 1 of the drawings.

The instrumentation described above in connection with the flow of cold fluid to the process 60 through the line 58 actuates the shaft 64a connected to the instrumentation of the hot water line 10a, the movement of the shaft being proportional to the total quantity of heat which must be supplied by the hot water introduced into the process 60 through the line 10a.

The operation of the apparatus described in connection with Fig. 5 of the drawings might be applied to the process of fractional distillation, in which case the rate meter 16a might be replaced with a device indicative of the percentage of the feed to be taken overhead. Devices for continuously determining specific gravity or vapor pressure could be suitably calibrated for this purpose. The rate meter 16b might be on the reflux stream to the column, which would be kept proportional to the quantity of the material taken overhead. If the temperature of the reflux was variable, the temperature instrument 14b would then adjust the reflux rate in proportion to the quantity of heat required to raise a unit quantity of reflux from the reflux temperature to the column temperature.

In some cases the process of Fig. 5 might be applied to the determination of a volume rate of flow corrected to some standard temperature. In such a case the movement of the fulcrum 36a would be calibrated in terms of the coefficient of thermal expansion of the flowing fluid. A display means attached to the bellows 66 would then be calibrated in terms of rate of flow corrected to a standard temperature base, such as 60° F. The additional equipment shown in Fig. 5 would not be required in the determination of volume rate of flow.

The showing in Fig. 6 of the drawings illustrates more particularly some of the details of a pneumatic type instrument for control of the process shown in Fig. 1 of the drawing. It will be noted in Fig. 6 that the air supply lines are shown more in detail in connection with the instrument. The temperature instrument 14, the rate-of-flow instrument 16, and the controlling means 56, are not shown, although the air lines leading to the instruments 14 and 56, are indicated.

Air is supplied to the instrument in the usual manner through a supply line 70, a direct control head 72 of known construction, and an air reducing tube 74 also of known construction. From the reducing tube 74 the air passes at reduced pressure through lines 76 and 78 to the pivoted air nozzle 24. A branch air line 80 is connected to a diaphragm 82 on the control head 72. A line 84 supplies air from the control head to a controlled element such as motor valve 18, as shown in Fig. 1. Air is also supplied from the control head 72 through a line 86 to a reactor 88 which usually includes a bellows and which is responsive to the pressure in the line 84, leading to the controlling means and the control valve. A line 90 leads from an instrument such as 14 in Fig. 1, to measuring device 92 which corresponds to the bellows 32 in Fig. 1.

In Fig. 6 the element sensitive to flow is shown diagrammatically at 94 and it is connected by an arm 52 to a lever 50 pivoted on a shaft 96. It will be noted that certain of these elements correspond to elements in Fig. 1 of the drawings. A branch 98 of the arm 50 is connected to the lower end of the lever 38 while the other end is connected by means of an arm 100 to one end of a pivoted differential lever 102, the other end of which is tied by a flexible link to the lower point of a segment 104 on the reactor 88. The segment 104 provides for various connections of the flexible link, depending upon whether the instrument is direct or reverse acting. The connection shown is a direct acting connection. The connecting elements from the measuring member 92 to the lever 38 are the same as in Fig. 1 of the drawings.

The nozzle 24 is pivoted directly on the shaft 96 as is also the flapper 26 which is engaged by a contact arm of a generally V-shaped member 106 in which the differential lever 102 is pivoted. The member 106 is pivoted on the shaft 96 and comprises a part of the differential lever mechanism. The Y-shaped lever, including the elements 50 and 98, includes a connecting arm 108 which mounts and operates an indicator 110 in the usual manner. The nozzle 24 is connected by means of a flexible connection 112 to a control point setter 114. A coil spring 116 maintains the flapper 26 in engagement with the contact arm of the differential lever mechanism.

In the instrument as shown in Fig. 6, it will be noted that any fluctuation in the variable measured by 92 serves to move the fulcrum 36 along the lever 38 so as to vary the movement of the differential lever mechanism and the flapper 26. The temperature control is therefore effected between the differential lever mechanism, the flapper 26 and the arm 98. The operation of the instrumentation shown in Fig. 6 is readily apparent from the description given above in connection with Fig. 1 of the drawings.

From the foregoing description, it will be apparent that the method of the present invention is primarily one for solving differential equations in which the differential quantities are functions of the process variables to which the method is applied. For example, it will be obvious by reference to Figs. 3 and 4 of the drawings, that the motion or distance $d_2$ is a function of the motion or distance $d_1$, and of the movement or motion of fulcrum 36. If $d_1$, $d_2$ and the motion of fulcrum 36 are represented by the differential quantities $dx$, $dy$ and $dz$, respectively, the differential equation is as follows:

$$dy = f(dx, dz)$$

This equation applies particularly to Fig. 1, in which the travel of the motor valve 18 is a function of $y$, and $x$ and $z$ are functions of the hand-setting device 22 and of the temperature and thermal properties of the fluid in the line 10, respectively.

The differential equation for the process and arrangement shown in Fig. 5 is:

$$dy = f(dw, dx, dz)$$

In this equation the travel of the motor valve 18b is a function of $y$, $w$ is a function of the temperature and thermal properties of the cold fluid, $x$ is a function of the volume rate of flow of cold fluid, and $z$ is a function of the temperature and thermal properties of the hot fluid.

In order for the method to give precise solutions, a linear relationship must exist between $dy$ and the function $f(dw, dx, dz)$. This will not necessarily mean that a linear relationship must exist between each of the functions and its respective process variable. For example, if the rate-of-flow instrument 16 of Fig. 1 is of the conventional orifice type, the movement of its display means will be proportional to the square of the rate of flow, or $x = f(Q^2)$, in which Q is the rate of flow. If the temperature instrument is of the vapor tension type, the movement of the bellows 32 will be a function of the rate of change of vapor pressure of the filling fluid with temperature. Over fairly wide temperature ranges, the relationship between temperature and vapor pressure can be expressed as:

$$\text{Log}_{10} P = f\left(\frac{1}{T}\right), \text{ or } P = f\left(10^{\frac{1}{T}}\right)$$

hence $$z = f\left(10^{\frac{1}{T}}\right)$$

However, in most problems of this kind, if the required rate of flow of the cold fluid to the process is computed for several temperatures of the cold fluid, and the square of these rates plotted against the vapor pressure of the thermometric liquid at the temperature for which the rate is determined, it will be found that a linear relationship exists between the two. Thus, although neither $x$ nor $z$ are linear functions, the relation between $x$ and $z$ is linear, and hence the relationship between $dy$ and $f(dx, dz)$ is also linear.

The control method of the present invention is applicable to many kinds of processes in addition to those briefly referred to in the foregoing description. For example, the instrument may be used for the control of a volume rate of flow in which the pressure is a variable factor, as for instance, in an oil producing well operated by the gas lift method. While the instrumentation as described in connection with the control method is of a pneumatic air pressure type, it will be apparent that instruments of other types may be modified to accomplish substantially the same results. For example, the nozzle 24 and flapper 26 might be two parts of a variable capacitance or inductance in an electric circuit or two points touching on a slide wire in a galvanometer or Wheatstone bridge circuit. In this case, the air supplied to the bellows would be electrically controlled or the bellows might be replaced by electric motors or by a combination of electric motors and hydraulic systems. Other changes may be made in accordance with the foregoing description, and such changes are contemplated as coming within the scope of the appended claims.

What I claim as new is:

1. In an instrument for the control of process variables, a regulating device having thereon a movable block, a control point setting device, an arm pivoted at one end to the block movable on the regulating device and linked to the control point setting device at the other end, a shaft in parallel alignment with the aforesaid arm and free to move in the direction of its longitudinal axis, said position of parallel alignment being the position of zero setting of the instrument, a bushing about the aforesaid arm, a member rigidly attached to the shaft at one end and pivoted to the arm bushing at the other end, means for operating the movable block to bring the arm out of parallel alignment with the shaft, and means for moving the shaft axially in response to changes in a process variable thereby causing the arm to rotate about its pivoted end and causing the control point setting device linked to its other end to move proportionately with changes in the process variable causing movement of the shaft.

2. An instrument as claimed in claim 1 characterized in that the means for operating the movable block includes means responsive to changes in a separate process variable.

MARION LEON ARNOLD.

REFERENCES CITED

The following references are of record in the file of this patent:

UNITED STATES PATENTS

| Number | Name | Date |
|---|---|---|
| 1,721,800 | Wunsch | July 23, 1929 |
| 2,273,103 | Harrison | Feb. 17, 1942 |
| 2,289,892 | Whitten | July 14, 1942 |
| 2,305,070 | Butler | Dec. 15, 1942 |
| 2,416,453 | Mather et al. | Feb. 25, 1947 |

FOREIGN PATENTS

| Number | Country | Date |
|---|---|---|
| 638,799 | France | Feb. 27, 1928 |

OTHER REFERENCES

Ziebolz: "Relay Devices and their Application to the Solution of Mathematical Equations," by H. Ziebolz, published 1940 by the Askania Regulator Co., Chicago, Ill. (two volumes) vol. I, Text, pages 30, 31 and 32. Vol. II, Diagrams, pages 20, 21 and 22.